United States Patent
Thibault et al.

(10) Patent No.: US 6,899,044 B2
(45) Date of Patent: May 31, 2005

(54) SWINGING GATE ASSEMBLY, ELECTRONIC LIVESTOCK FEEDING STATION, AND AUTOMATED SORTING SYSTEM

(75) Inventors: Ronald M. Thibault, Osborne, KS (US); George R. Eakin, Osborne, KS (US)

(73) Assignee: Osborne Industries, Inc., Osborne, KS (US)

( * ) Notice: Subject to any disclaimer, the term of this patent is extended or adjusted under 35 U.S.C. 154(b) by 0 days.

(21) Appl. No.: 10/918,145

(22) Filed: Aug. 12, 2004

(65) Prior Publication Data

US 2005/0028752 A1 Feb. 10, 2005

Related U.S. Application Data

(62) Division of application No. 10/456,571, filed on Jun. 5, 2003.
(60) Provisional application No. 60/386,281, filed on Jun. 5, 2002.

(51) Int. Cl.[7] .............................................. A01K 1/10
(52) U.S. Cl. ................................................ 114/51.02
(58) Field of Search ........................... 119/51.02, 840, 119/842

(56) References Cited

U.S. PATENT DOCUMENTS

| | | | | |
|---|---|---|---|---|
| 182,688 A | * | 9/1876 | Minor .......................... | 119/840 |
| 2,504,214 A | * | 4/1950 | Miller et al. ................. | 119/840 |
| 4,138,968 A | * | 2/1979 | Ostermann ................... | 119/842 |
| 4,145,994 A | * | 3/1979 | Miller .......................... | 119/840 |
| 4,280,448 A | * | 7/1981 | Ostermann ................... | 119/842 |
| 4,336,768 A | * | 6/1982 | Wagner ........................ | 119/840 |
| 4,559,904 A | * | 12/1985 | Harmsen ................... | 119/51.02 |
| 4,617,876 A | * | 10/1986 | Hayes ........................ | 119/842 |
| 5,183,008 A | * | 2/1993 | Carrano ....................... | 119/840 |
| 5,579,719 A | * | 12/1996 | Hoff et al. ................ | 119/51.02 |
| 5,628,284 A | * | 5/1997 | Sheen et al. ................ | 119/840 |
| 5,673,647 A | * | 10/1997 | Pratt ........................ | 119/51.02 |
| 5,734,128 A | * | 3/1998 | Gades et al. ................ | 177/244 |
| 5,988,106 A | * | 11/1999 | van den Berg .......... | 119/51.02 |
| 6,239,711 B1 | * | 5/2001 | Downey et al. ............ | 340/666 |
| 6,526,919 B1 | * | 3/2003 | Schick ....................... | 119/840 |
| 6,805,075 B2 | * | 10/2004 | Pratt ........................ | 119/51.02 |
| 2003/0192487 A1 | * | 10/2003 | Zimmerman ................ | 119/842 |
| 2003/0226522 A1 | * | 12/2003 | Thibault ..................... | 119/842 |

* cited by examiner

*Primary Examiner*—Teri Pham Luu
*Assistant Examiner*—Jordan Lofdahl
(74) *Attorney, Agent, or Firm*—Jeffrey L. Thompson; Thompson & Thompson, P.A.

(57) ABSTRACT

A swinging gate assembly is provided for use in an electronic livestock feeding station and an automated sorting system. The gate assembly has a generally V-shaped configuration in plan view with first and second side openings defined on each side of the V-shape. A gate panel has a first side edge pivotally connected to the frame for rotation about a substantially vertical first pivot axis at the apex of the V-shape. The gate panel is swingable about the first pivot axis between a first position in which the first side opening is closed by the gate panel and a second position in which the second side opening is closed by the gate panel. A mechanical actuator and locking assembly is provided for moving the gate panel between the first and second positions and locking the gate panel in a selected one of the positions.

10 Claims, 6 Drawing Sheets

SWINGING GATE ASSEMBLY, ELECTRONIC LIVESTOCK FEEDING STATION, AND AUTOMATED SORTING SYSTEM

RELATED APPLICATIONS

This application is a divisional of the Applicants' U.S. patent application Ser. No. 10/456,571 filed on Jun. 5, 2003, which claims priority of U.S. Provisional Application No. 60/386,281 filed on Jun. 5, 2002.

BACKGROUND OF THE INVENTION

Electronic feeder stations for gestating sows are known in the prior art. A typical feeder station allows one sow to enter the station and eat its allotted feed amount without competition from other gestating sows in a group managed system. For example, a feeder station may have an entry gate which restricts entry to one sow at a time, a protected race, a feed bowl, an exit way with a one-way gate to prevent entry of animals as the eating sow leaves, and a feed and water dispensing mechanism with a feed hopper, and feed station controller connected to a PC in a control room. Groups of sows, typically 50 to 60, are fed sequentially by the feeder station.

The Applicants have discovered that maintaining a farrowing group (i.e., sows with similar expected farrowing dates) together as much as possible is advantageous because it avoids the social adjustment that arises when new animals are introduced into a group. This practice works well for sow farms that manage increments of 1,200 sows because, typically, 50 sows are farrowed each week in such a farm (or 100 for a 2,400 sow farm, 150 for a 3,600 sow farm, etc.). For such a farm, typically 62 to 65 animals are bred with the expectation that about 20 to 25% of the sows will recycle and not maintain their pregnancy. Thus, a farrowing group may start with 62 to 65 animals in the group, but by the end of the 114-day gestation period, only about 50 animals remain in the group. This group size fits the capacity of one typical feeder station perfectly because up to about 65 animals can be fed by one feeder station in a day without overloading the station.

When the size of the sow farm does not permit optimum group sizes, then the feeder stations are under utilized and less economic, or group mixing must occur which creates undesirable behavior between animals and difficulties for the farmer. Thus, there is a need in the industry for an improved feeder station that solves these problems.

SUMMARY OF THE INVENTION

The present invention solves the problems with the existing feeder stations described above by fitting swinging gate assemblies at the entry and exit sides of the feeder station. The gate assemblies operate to allow one pen of sows to use the feeder station for a first time period (e.g., 12 hours). The gate assemblies are then automatically repositioned to allow an adjoining pen of sows to use the feeder station for a second time period (e.g., 12 hours). The use times for each pen can be set at any desired time period.

With the present invention, two groups of up to about 32 sows can use the same feeder station. Therefore, sow farms of about 600 sows can efficiently employ a feeder station and still keep gestating sows in "static" groups that start at about 32 bred sows, but drop to about 25 animals ready for farrowing after 114 days. These static groups can then be kept together without mixing during gestation.

The swinging gate assemblies at the entry and exit sides of the feeder station operate to route the sows into the feeder station and then, when they leave, back into their original group. Avoiding accidentally routing the exiting sow into the neighboring group is important because they would then be forced to endure severe punishment from their new pen mates. The present invention accomplishes this in two ways. First, the swinging gate assemblies are prevented from moving until two infrared detectors, one near the entry gate and one near the feeder, positively show that no animal remains in the feeder station. The control system associated with the feeder station is set to reposition the swinging gate assemblies based on the preset time interval and switching time, but will delay the repositioning until both infrared detectors indicate that no animal remains in the feeder station.

Second, to prevent sows from forcing their way into the feeder station from the excluded group, the swinging gate assemblies are each locked into position by an over-center action that provides mechanical locking rather than relying on the air cylinder to hold the gates in position. This is an important feature because sows are powerful enough to overpower the air cylinder and open the swing gate to gain entry into the feeder station. Success at defeating the air cylinder would again lead to group mixing and potential animal injury. The over-center mechanical lock prevents this from occurring. A further failure could occur if air pressure is lost. The mechanical lock remains in position and prevents loss of control of the gate assemblies, even if air pressure is lost.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A swinging gate assembly 10 according to a preferred embodiment of the present invention will now be described with reference to FIGS. 1 to 7 of the accompanying drawings.

The swinging gate assembly 10 has a frame 11 having a generally V-shaped configuration in plan view. The frame 11 has structural members 12–15 that define a first rectangular side opening 16 and structural members 17–20 that define a second rectangular side opening 21. The first and second side openings 16, 21 are located on each side of an apex 22 of the V-shaped configuration. The frame 11 has a first connection plate 23 at the apex 22 of the V-shaped configuration for connecting to a partition or wall separating two pens of livestock. The frame 11 has second and third connection plates 24, 25 arranged at the open side of the V-shaped configuration for connecting to respective sides of a feeding station, a sorting alley, or the like.

The gate assembly 10 includes a gate panel 26 having a generally rectangular shape with a top edge 27, a bottom edge 28, and first and second side edges 29, 30. A suitable structure 31, such as a series of rods or tubes, extends between the edges 27–30 to prevent animals from passing through the gate panel 26. The first side edge 29 of the gate panel 26 is pivotally connected to the frame 11 at or near the apex 22 of the V-shaped configuration for rotation about a substantially vertical first pivot axis 32. The gate panel 26 is swingable about the first pivot axis 32 between a first position (FIGS. 1 and 4) in which the first side opening 16 of the frame 11 is closed by the gate panel 26 and the second side opening 21 of the frame 11 is open, and a second position (FIGS. 3 and 6) in which the first side opening 16 is open and the second side opening 21 is closed by the gate panel 26. In the first position, animals are allowed to pass through the second side opening 21 of the frame 11 but are prevented by the gate panel 26 from passing through the first side opening 16 of the frame 11. In the second position, animals are allowed to pass through the first side opening 16 of the frame 11 but are prevented by the gate panel 26 from passing through the second side opening 21 of the frame 11.

A mechanical actuator and locking assembly 33 is provided for moving the gate panel 26 between the first and second positions and locking the gate panel 26 in a selected one of the first and second positions. The mechanical actuator and locking assembly 33 includes an air cylinder 34 having a first end 35 connected to the frame 11 and a second end 36 connected to a toggle arm 37. The first end 35 of the air cylinder 34 is connected to the frame 11 at a pivot point 38 which is offset a predetermined distance from the apex of the V-shaped configuration. The toggle arm 37 couples the air cylinder 34 to the gate panel 26 in such a way as to prevent forced movement of the gate panel 26 out of the first or second positions unless the air cylinder 34 is actuated.

Figure 1:
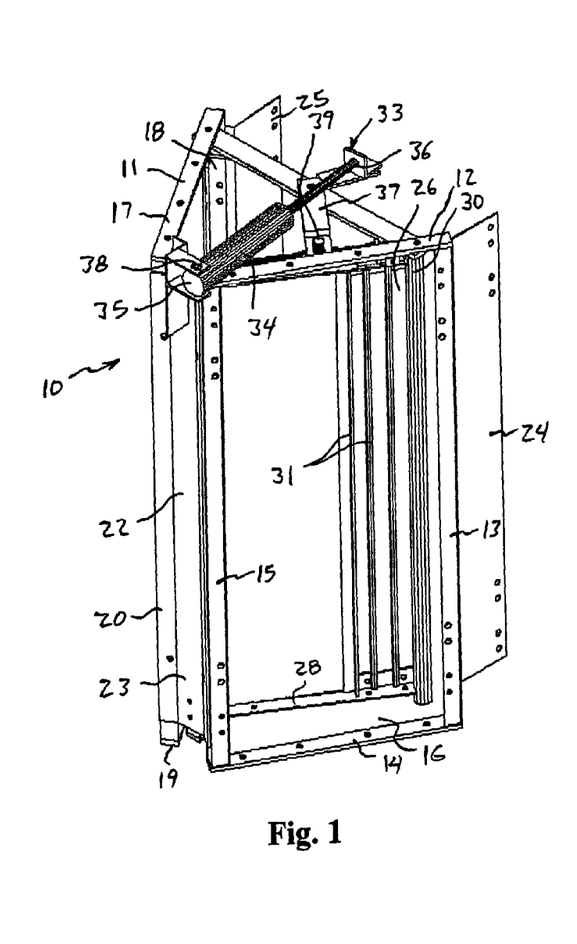
FIG. 1 is a perspective view of a swinging gate assembly according to the present invention showing a gate panel in a first locked position.
Figure 2:
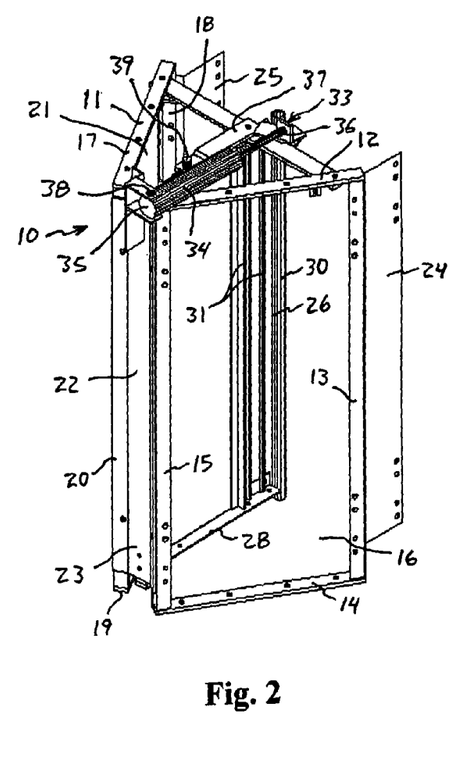
FIG. 2 is a perspective view of the swinging gate assembly showing the gate panel in an intermediate position as it moves between the first locked position and a second locked position.
Figure 3:
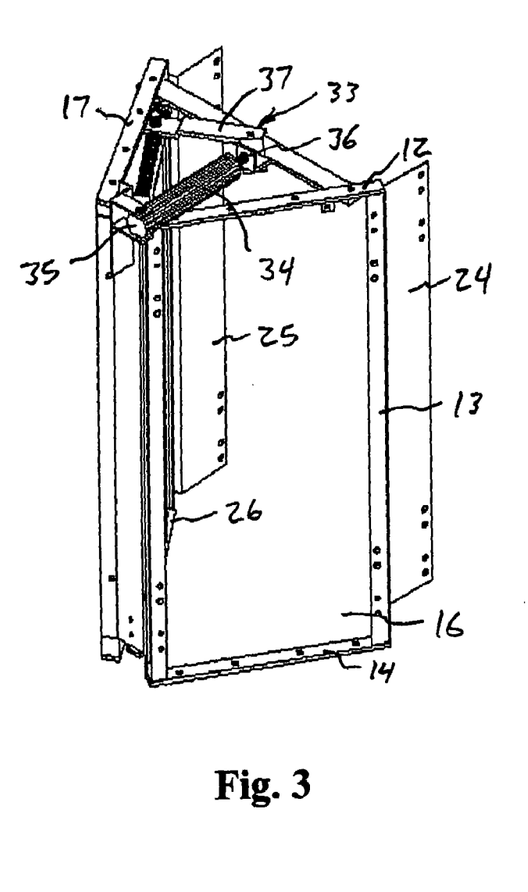
FIG. 3 is a perspective view of the swinging gate assembly showing the gate panel in the second locked position.
Figure 4:
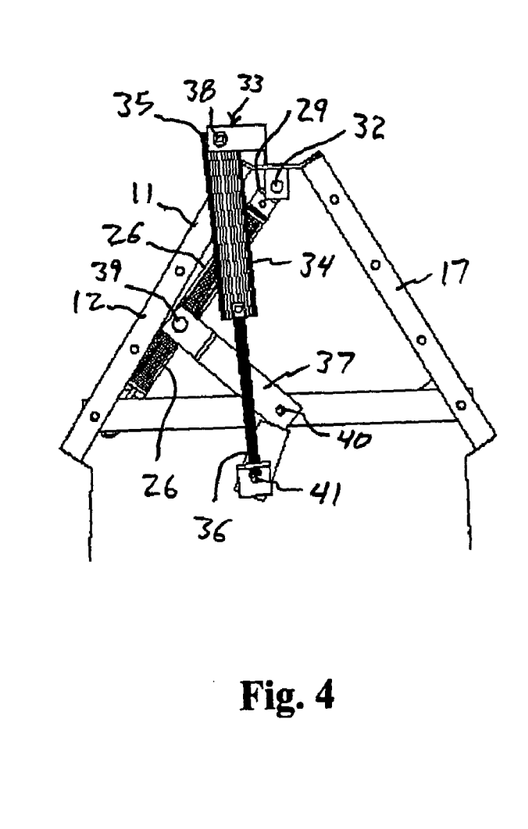
FIG. 4 is a plan view of the swinging gate assembly with the gate panel in the first locked position.
Figure 5:
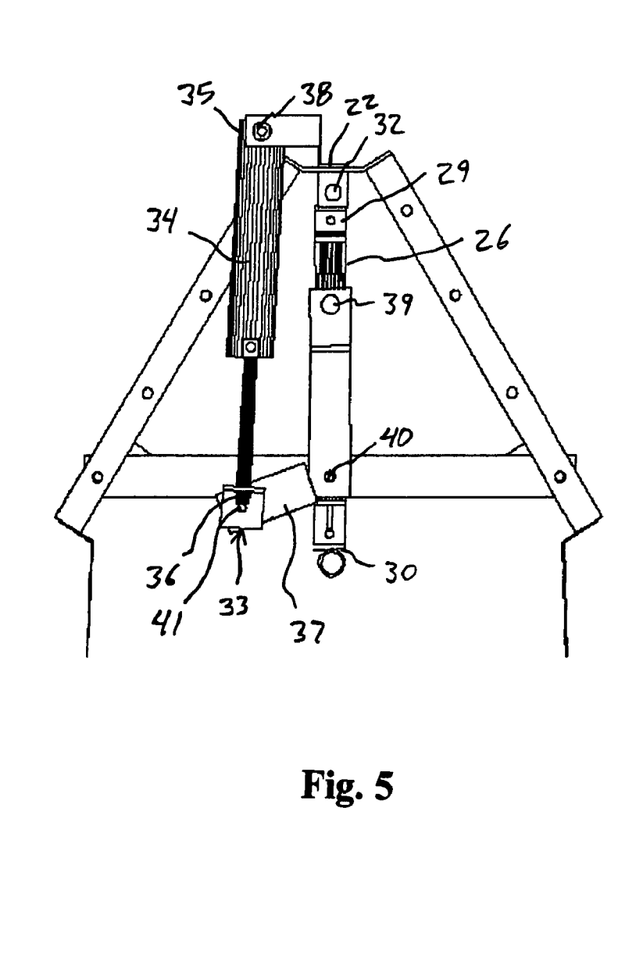
FIG. 5 is a plan view of the swinging gate assembly with the gate panel in the intermediate position as it moves between the first and second locked positions.
Figure 6:
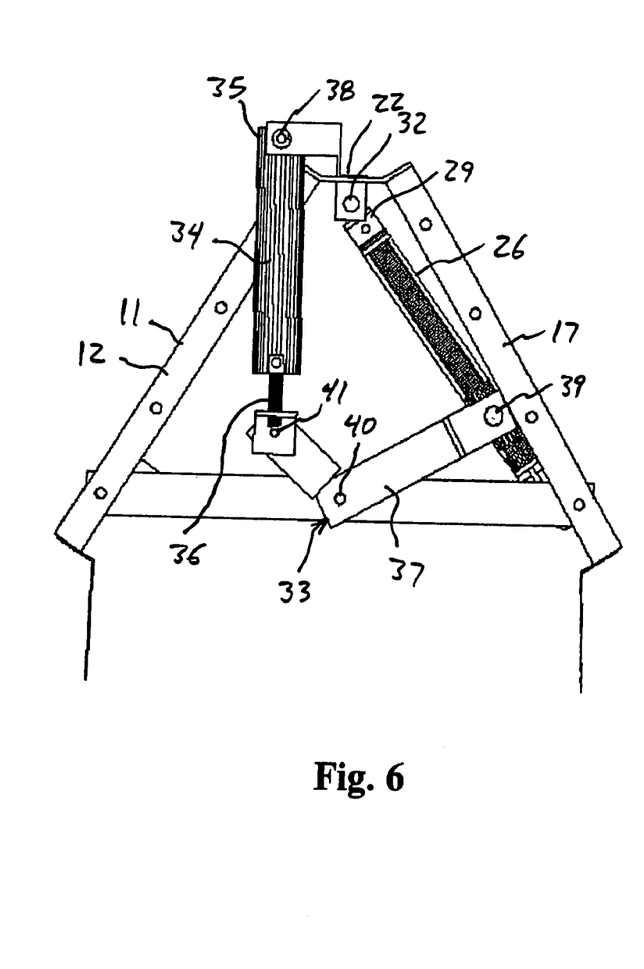
FIG. 6 is a plan view of the swinging gate assembly with the gate panel in the second locked position.
Figure 7:
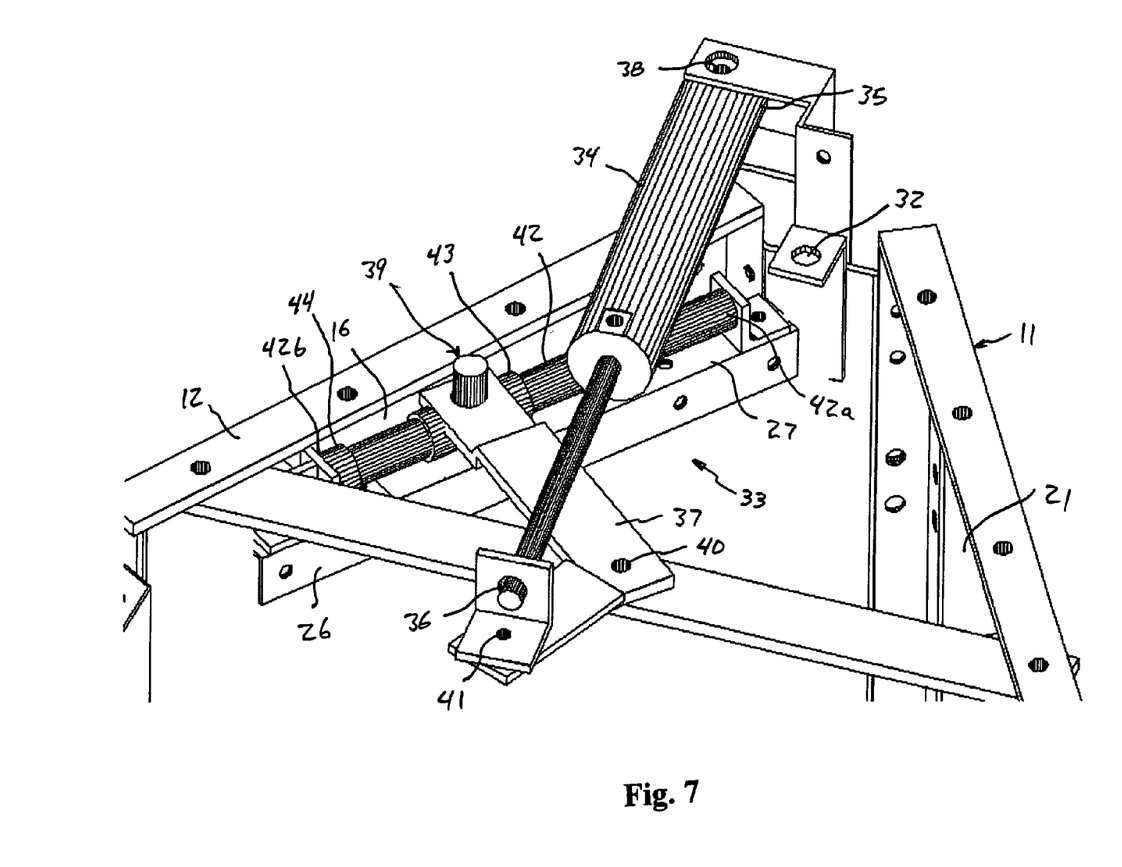
FIG. 7 is a detail perspective view of a sliding pivot connection between the gate panel and a toggle arm used to swing the gate panel between its first and second locked positions.

The toggle arm 37 has first, second, and third connection points 39–41. The first connection point 39 is pivotally and slidably connected to the gate panel 26 along the upper edge of the gate panel 26. More specifically, as shown in FIG. 7, a slide bar 42 is attached at its ends 42a, 42b to the upper edge 27 of the gate panel 26, and a tubular member 43 is mounted for sliding movement along the slide bar 42. The toggle arm 37 is pivotally connected to the tubular member 43 at the first connection point 39.

The toggle arm 37 is pivotally connected to the frame 11 at the second connection point 40 for rotation about a substantially vertical second pivot axis. The second pivot axis of the second connection point 40 is spaced from the first pivot axis 32 and located substantially equidistant between the first and second side openings 16, 21 of the frame 11. The toggle arm 37 is pivotally connected to the second end 36 of the air cylinder 34 at the third connection point 41. The first, second, and third connection points 39–41 of the toggle arm 37 define a triangular shape. The toggle arm 37 itself can be a generally L-shaped arm as shown in the drawings, or it can be triangular-shaped, V-shaped, or any other suitable shape as long as the first, second, and third connection points 39–41 are positioned at the apexes of a triangular shape.

The gate panel 26 is selectively moved between its first and second positions by pivoting the toggle arm 37 in a desired direction by extending or retracting the air cylinder 34. The toggle arm 37 is pivoted by the air cylinder 34 until a line passing through the first and second connection points 39, 40 of the toggle arm moves slightly past ("over-center") a position in which the line is perpendicular to the gate panel 26. A stop structure 44 is provided to limit further movement of the toggle arm 37 once it reaches its slightly over-center position. The stop structure 44 can be a suitable abutment associated with the air-cylinder 34 or the sliding pivot connection 39 between the toggle arm 37 and the gate panel 26.

The implementation and operation of the swinging gate assembly 10 described above will now be described below with reference to FIGS. 8 and 9 which show two embodiments in which the gate assembly 10 is used.

Figure 8:
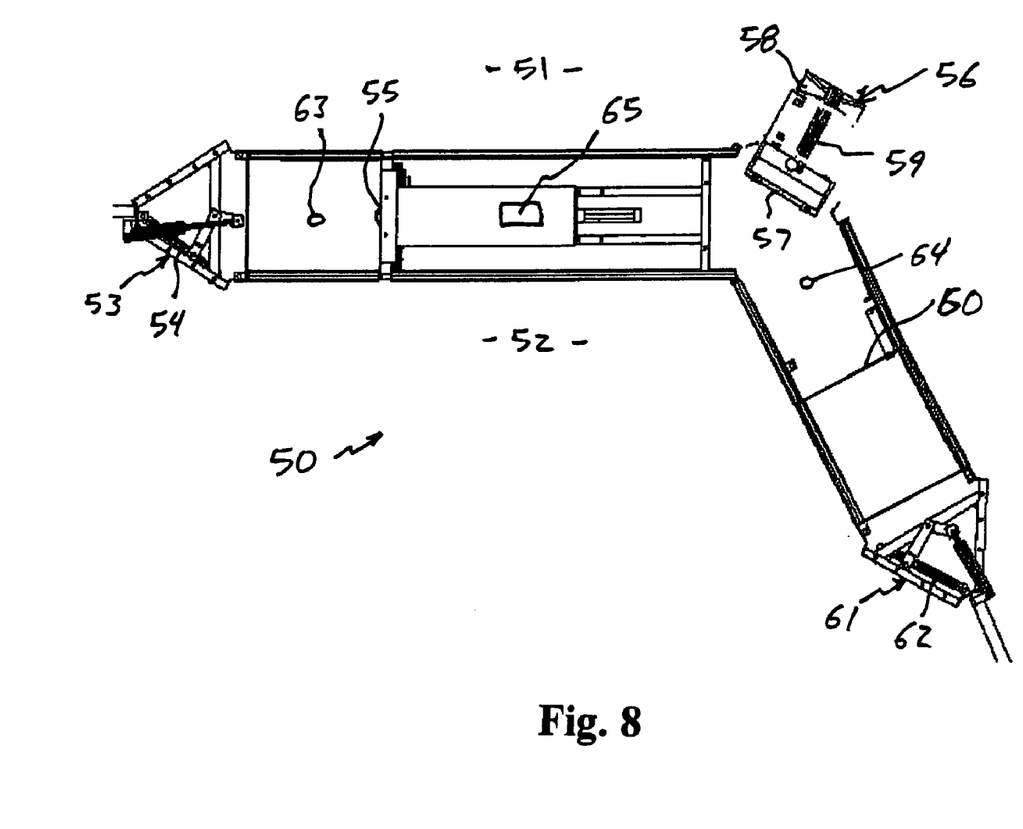
FIG. 8 is a plan view of an electronic livestock feeding station for use with multiple pens of livestock which includes a pair of swinging gate assemblies according to the present invention.

An electronic livestock feeding station 50 for use with multiple pens of livestock is shown in FIG. 8. The feeding station 50 is positioned between and shared by two pens 51, 52 of livestock which must be kept separated.

A first swinging gate assembly 53 is positioned at an entry side of the feeding station 50. The gate assembly 53 includes a first gate panel 54 which is selectively swingable between a first position (shown in FIG. 8) in which animals in the first pen 51 are allowed to pass through the first gate assembly 53 into the feeding station 50 and animals in the second pen 52 are not allowed to pass through, and a second position (not shown) in which animals in the second pen 52 are allowed to pass through the first gate assembly 53 into the feeding station 50 and animals in the first pen 51 are not allowed to pass through. The first gate assembly 53 has the same structure as the gate assembly 10 described above and shown in FIGS. 1 to 7.

A one-way entry gate 55 is provided in the feeding station 50 after the first swinging gate assembly 53. The entry gate 55 functions to restrict entry into the feeding station 50 to one animal at a time. The entry gate 55 may have a conventional structure known in the prior art.

A feed dispensing system 56 is provided in the feeding station 50 after the entry gate 55. The feed dispensing system 56 includes a feeder 57 from which the animal eats, a hopper 58 containing a supply of feed, and a mechanism 59 for selectively dispensing an allotted ration of feed from the hopper 58 into the feeder 57 for each animal entering the feeding station 50.

A one-way exit gate 60 is provided in the feeding station 50 after the feed dispensing system 56. The exit gate 60 functions to prevent entry of other animals as an animal within the feeding station 50 leaves the feeding station. The exit gate 60 may have a conventional structure known in the prior art.

A second swinging gate assembly 61 is provided in the feeding station 50 after the exit gate 60. The second gate assembly 61 includes a second gate panel 62 which is selectively swingable between a first position (shown in FIG. 8) in which animals leaving the feeding station 50 are directed back into the first pen 51, and a second position (not shown) in which animals leaving the feeding station 50 are directed into the second pen 52. The second gate assembly 61 has the same structure as the gate assembly 10 described above and shown in FIGS. 1 to 7.

A first infrared detector 63 is positioned near the first gate assembly 53 for detecting the presence of an animal within the feeding station 50. A second infrared detector 64 is positioned near the feed dispensing system 56 for detecting the presence and identity of an animal within the feeding station 50.

A control system 65 is provided which receives inputs from the first and second infrared detectors 63, 64. The control system 65 communicates with the feed dispensing system 56 for causing a desired ration of feed to be dispensed from the hopper 58 into the feeder 57 based on the detected identity of the animal within the feeding station 50.

The control system 65 also functions to reposition the first and second swinging gate assemblies 53, 61 at preset time intervals according to a user-defined program. For example, the user-defined program may cause the control system 65 to reposition the first and second swinging gate assemblies 53, 61 every 12 hours so that the first pen 51 can access the feeding station 50 for the first 12 hours and then the second pen 52 can access the feeding station 50 for the next 12 hours and so on. The control system 65 can thus provide equal sharing of the feeding station 50 between multiple pens 51, 52 of animals.

To avoid mixing the animals in the first pen 51 with the animals in the second pen 52, the first and second gate assemblies 53, 61 should not be repositioned while an animal is present within the feeding station 50. Thus, the control system 65 is set to prevent repositioning of the gate assemblies 53, 61 at the end of a preset time interval when the presence of an animal is detected within the feeding station 50 by either of the first or second infrared detectors 63, 64.

Figure 9:
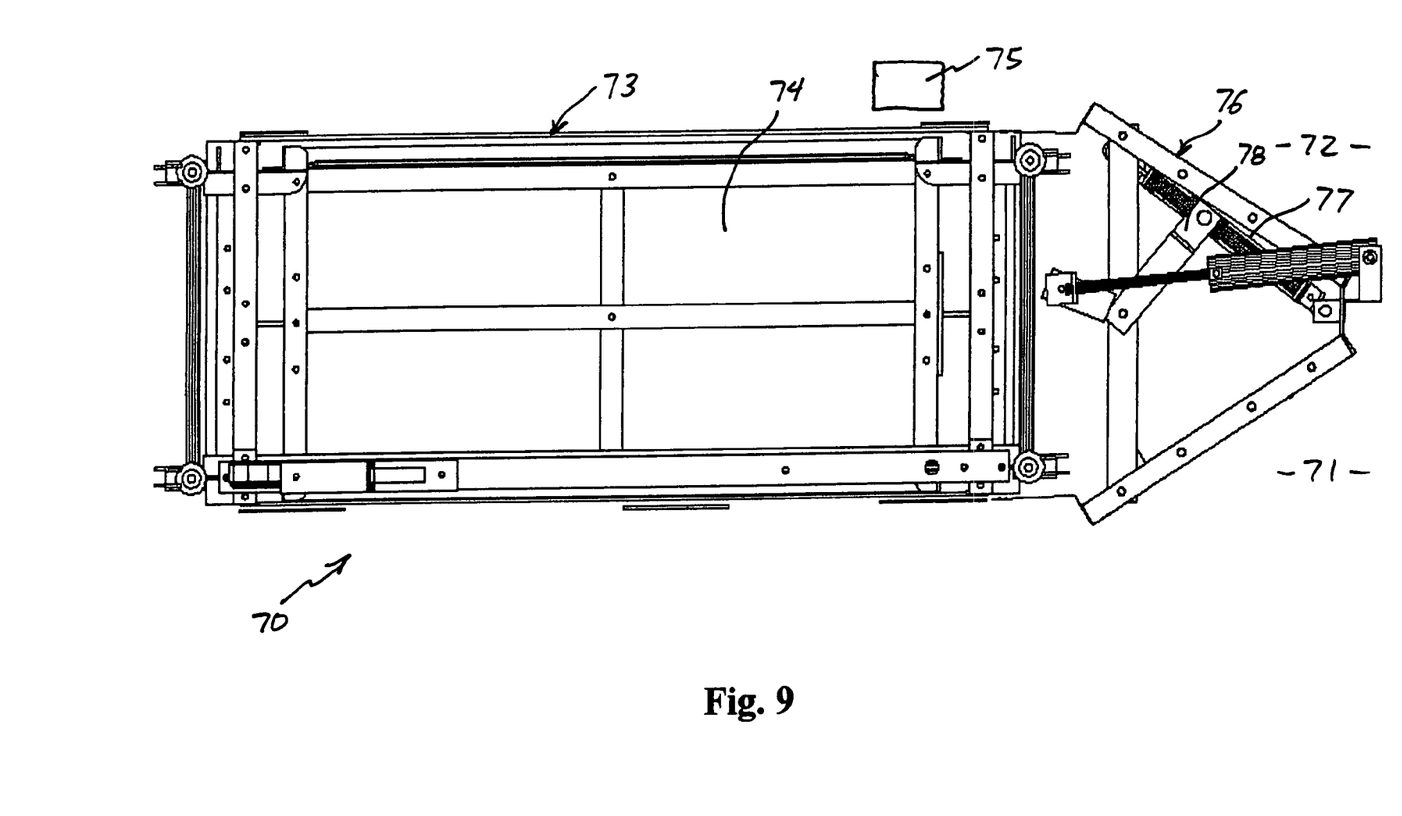
FIG. 9 is a plan view of an automated sorting system using the swinging gate assembly according to the present invention.

An automated sorting system 70 for livestock is shown in FIG. 9. The automated sorting system 70 provides a system for sorting heavier animals (e.g., animals that have achieved an optimum weight for marketing) from lighter weight animals and directing the sorted animals into two different pens 71, 72.

The sorting system 70 includes a scale 73 for individually weighing animals as the animals walk across or stand on a platform 74. A control means 75 receives an input from the scale 73 indicative of each animal's weight and determines whether or not the animal exceeds a predetermined threshold weight.

A swinging gate assembly 76 is provided having a gate panel 77 which is selectively swingable between a first position (shown in FIG. 9) in which an animal leaving the scale 73 is directed into the first pen 71, and a second position (not shown) in which the animal leaving the scale 73 is directed into the second pen 72. The swinging gate assembly 76 has a locking structure 78 that locks the gate panel 77 in a selected one of the first and second positions. The swinging gate assembly 76 has the same structure as the gate assembly 10 described above and shown in FIGS. 1 to 7.

The swinging gate assembly 76 is moved between its first and second positions based on the determination made by the control means 75 as to whether or not each particular animal exceeds the predetermined threshold weight. Thus, the heavier animals are automatically directed into one of the pens 71, 72 and the lighter animals are automatically directed into the other one of the pens 71, 72.

The automated sorting system 70 further includes a one-way entry gate (not shown) that restricts entry onto the scale 73 to one animal at a time, and a one-way exit gate (not shown) that prevents entry of other animals onto the scale 73 as an animal leaves the scale 73.

It will be appreciated that certain features of the present invention described above can be changed without departing from the scope of the invention. For example, other types of actuators, such as hydraulic or electric driven actuators, can be used instead of the air cylinder 34. The shape of the frame 11, the gate panel 26, and the toggle arm 37 can be changed while still maintaining the over-center locking action to keep the gate panel 26 locked in its respective positions. Additional gate assemblies could be incorporated into the above-described feeder station 50 to allow more than two separate pens and groups of animals to use a single feeder station without group mixing. Additional gate assemblies could also be incorporated into the above-described automated sorting system 70 to allow animals to be sorted into more than two groups.

While the invention has been specifically described in connection with specific embodiments thereof, it is to be understood that this is by way of illustration and not of limitation, and the scope of the appended claims should be construed as broadly as the prior art will permit.

What is claimed is:

1. An electronic livestock feeding station for use with multiple pens of livestock, comprising:
 a first swinging gate assembly having a first gate panel which is selectively swingable between a first position in which animals in a first pen are allowed to pass through the first gate assembly into the feeding station and animals in a second pen are not allowed to pass through, and a second position in which animals in the second pen are allowed to pass through the first gate assembly into the feeding station and animals in the first pen are not allowed to pass through;
 a feed dispensing mechanism that selectively dispenses an allotted amount of feed to an animal within the feeding station;
 a second swinging gate assembly having a second gate panel which is selectively swingable between a first position in which animals leaving the feeding station are directed into the first pen, and a second position in which animals leaving the feeding station are directed into the second pen; and
 a control means for repositioning the first and second swinging gate assemblies between their respective first and second positions automatically at predetermined intervals to allow use of the feeding station by multiple pens of livestock.

2. The electronic livestock feeding station according to claim 1, further comprising a one-way entry gate that restricts entry into the feeding station to one animal at a time, and a one-way exit gate that prevents entry of other animals as the animal within the feeding station leaves the feeding station.

3. The electronic livestock feeding station according to claim 1, wherein said first and second swinging gate assemblies each comprises a mechanical actuator and locking assembly for moving said first and second gate panels between said respective first and second positions and mechanically locking said gate panels in a selected one of said positions.

4. The electronic livestock feeding station according to claim 3, wherein said mechanical actuator and locking assemblies each comprises a mechanical linkage that pivots over-center to lock the respective gate panel in a selected one of said positions.

5. The electronic livestock feeding station according to claim 3, wherein said mechanical actuator and locking assemblies each comprises an air cylinder, and a toggle arm which couples the air cylinder to the respective gate panel, said toggle arm being connected between a frame of the respective gate assembly and the respective gate panel in such a way as to prevent forced movement of the respective gate panel out of said first or second positions unless said air cylinder is actuated.

6. The electronic livestock feeding station according to claim 1, wherein said control means repositions the first and second swinging gate assemblies according to a user-defined program.

7. The electronic livestock feeding station according to claim 1, further comprising at least one sensor for detecting the presence of an animal within the feeding station, and wherein said control means prevents repositioning of the first and second swinging gate assemblies between said first and second positions when the presence of an animal is detected within the feeding station by said at least one sensor.

8. The electronic livestock feeding station according to claim 7, wherein said at least one sensor comprises a first infrared detector positioned near the first gate assembly and a second infrared detector positioned near the feed dispensing mechanism.

9. The electronic livestock feeding station according to claim 7, wherein said at least one sensor comprises first and second sensors positioned to detect the presence of an animal within respective areas of the feeding station.

10. The electronic livestock feeding station according to claim 9, wherein said first and second sensors are infrared sensors.

* * * * *